US006299188B1

(12) United States Patent
Pertusi et al.

(10) Patent No.: US 6,299,188 B1
(45) Date of Patent: Oct. 9, 2001

(54) SUSPENSION STOP FOR AN AGRICULTURAL VEHICLE

(75) Inventors: Pierluigi Pertusi, Modena (IT); Eric Barnard, Corringham (GB)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/550,982

(22) Filed: Apr. 17, 2000

(30) Foreign Application Priority Data

Apr. 20, 1999 (GB) .................................................. 9908850

(51) Int. Cl.$^7$ ....................................................... B60G 9/02
(52) U.S. Cl. ................................. 280/124.111; 280/124.11
(58) Field of Search ..................... 280/124.111, 124.112, 280/124.113, 124.114, 124.11, 124.106; 180/349, 352, 358; B60G 9/02

(56) References Cited

U.S. PATENT DOCUMENTS 1,383,203 * 6/1921 Hartsock ........................ 280/124.11
5,322,310 * 6/1994 Hurlburt ........................ 280/124.113
5,879,016 * 3/1999 Altherr et al. ................ 280/124.112

FOREIGN PATENT DOCUMENTS 2-102811 * 4/1990 (JP) ................................. B60G/9/02
6-48150 * 2/1994 (JP) ................................. B60G/9/02

* cited by examiner

Primary Examiner—Peter C. English
(74) Attorney, Agent, or Firm—John William Stader; Larry W. Miller

(57) ABSTRACT

An agricultural vehicle is described having a front axle mounted on a suspension in a manner that permits the front axle to move up and down in relation to the vehicle body and to pivot about the vehicle longitudinal axis so as to allow the wheels on the ends of the axle to move up and down independently. In the invention, a stop plate is provided on the housing of the axle that projects vertically upwards towards the vehicle body. Abutment surfaces are provided on the vehicle body that straddle the stop plate. The surfaces abut the side edges of the stop plate at the limit of the permitted range of rotation of the front axle about the vehicle longitudinal axis.

7 Claims, 3 Drawing Sheets

SUSPENSION STOP FOR AN AGRICULTURAL VEHICLE

BACKGROUND OF INVENTION

1. Field of Art

The present invention relates to an agricultural vehicle having a front axle mounted on a suspension in a manner that permits the front axle to move up and down in relation to the vehicle body and to pivot about the vehicle longitudinal axis so as to allow the wheels on the ends of the axle to move up and down independently. A tractor of this type is described in U.S. Pat. No. 6,216,812.

2. Description of Prior Art

In a vehicle in which the front axle can only pivot about a longitudinal axis of the vehicle and cannot move up and down in relation to the vehicle body, it is possible to limit the rotation of the front axle along the vehicle longitudinal axis by providing fixed stops on the vehicle body that collide with the top surface of the housing of the axle at the limits of its permitted range of movement. Such suspension stops cannot however be used when the axle can move up and down as they would allow excessive pivoting of the axle when the axle has moved away from the vehicle body.

It is therefore an object of the present invention to provide a suspension stop for appropriately limiting the rotation of the axle about the longitudinal axis of the vehicle regardless of the height of the vehicle body above the axle.

SUMMARY OF INVENTION

According to the present invention, there is provided an agricultural vehicle having a front axle mounted on a suspension in a manner that permits the front axle to move up and down in relation to the vehicle body and to pivot about the vehicle longitudinal axis so as to allow the wheels on the ends of the axle to move up and down independently.

The vehicle is characterized in that the housing of the axle comprises a stop plate that projects vertically upwards towards the vehicle body and the vehicle body comprises abutment surfaces. The abutment surfaces straddle the stop plate and abut the side edges of the stop plate thus limiting the permitted range of rotation of the front axle about the vehicle longitudinal axis.

In the invention, because of its vertical length, the stop plate remains between the abutment surfaces in all vertical positions of the axle relative to the vehicle body and the stop plate will abut different regions of the abutment surfaces depending on the height of the vehicle body above the axle. By suitably shaping the side edges of the stop plate and the abutment surfaces it is possible to vary the range of angular movement of the axle in dependence upon the height of the vehicle above the axle.

The abutment surfaces on the vehicle body and the stop plate are preferably so shaped as to minimise the range of rotation of the axle about the vehicle longitudinal axis when the height of the vehicle above the axle is small (e.g. to avoid interference between the steerable wheels and the tractor chassis) and to maximise the range of rotation of the axle about the vehicle longitudinal axis when the height of the vehicle above the axle is large.

To this end the stop plate may have a first region nearer the axle housing in which the side edges of the stop plate have a small angle of taper and a second region further from the axle housing in which the sides edges of the stop plate have a larger angle of taper.

BRIEF DESCRIPTION OF DRAWINGS

The invention will now be described further, by way of example, with reference to the accompanying drawings, in which.

DETAILED DESCRIPTION OF INVENTION

Figure 1:
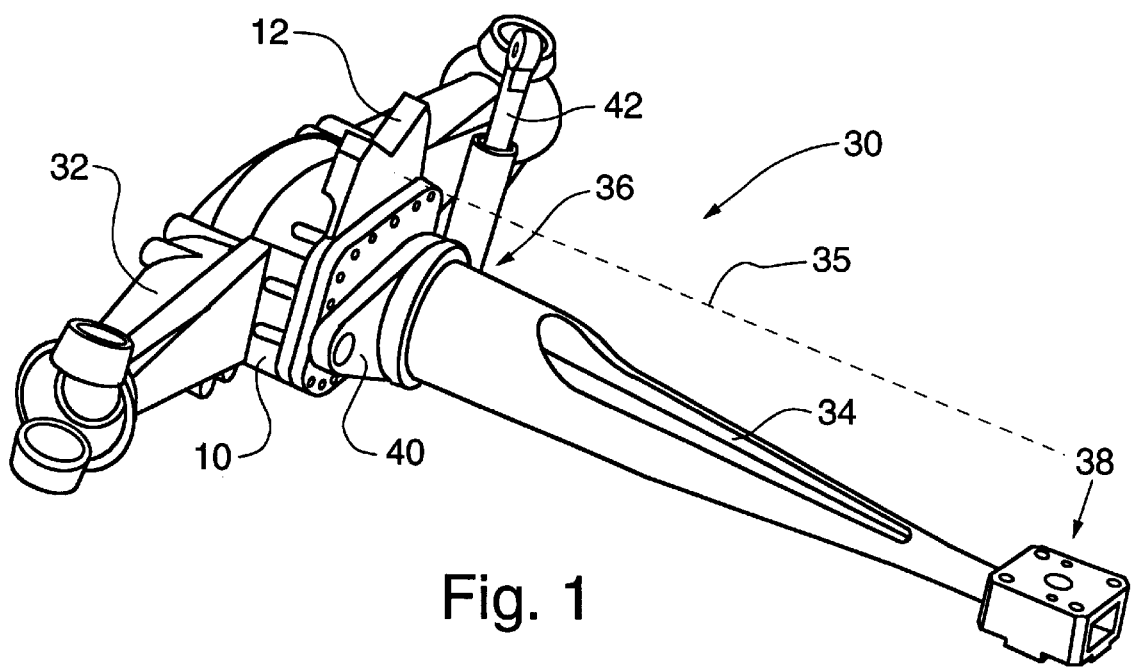
FIG. 1 is a view of a tractor front axle.

The axle 30 shown in FIG. 1, is T-shaped when viewed in plan with the front steerable wheels (not shown) of the tractor mounted on the ends of the cross bar 32 of the 'T'. A drive shaft extends along the upright 34 of the 'T' to a differential mechanism mounted within a housing 10 at the junction between the upright 34 and the cross bar 32 of the 'T'.

The axle 30 is journaled at two locations 36 and 38 along the length of the upright 34 of the 'T' so that it can rotate about the longitudinal axis 35 of the tractor thereby allowing the wheels to move up and down in relation to the tractor chassis. Conventionally, both of the support journals 36 and 38 of the front axle 30 are fixed in relation to the tractor chassis so that the front end of the axle cannot move up and down in relation to the chassis but can simply rotate about the vehicle longitudinal axis. In such an arrangement, it suffices to provide fixed bump stops to limit the rotation of the front axle relative to the body.

It has also been previously proposed to provide a suspension arrangement to allow the front support journal 36 to move in relation to the vehicle body. U.S. Pat. No. 6,216,812 referred to above uses a geometry based on a panhard rod to permit such movement of the axle but other suspension geometries can be used. In the axle 30 shown in FIG. 1, which is based on the above referred patent, the front support journal 36 is formed as part of a suspension plate 40 that can pivot in relation to the tractor chassis and that is further connected to the tractor chassis by a strut 42 comprising a spring and shock absorber. The pivoting of the suspension plate 40 serves to alter the height of the chassis above the differential housing 10. When the housing 10 of the front axle 30 can move in this way in relation to the tractor body, fixed bump stops can no longer be used to limit the rotation of the axle in its support journals 36 and 38.

Figure 2:
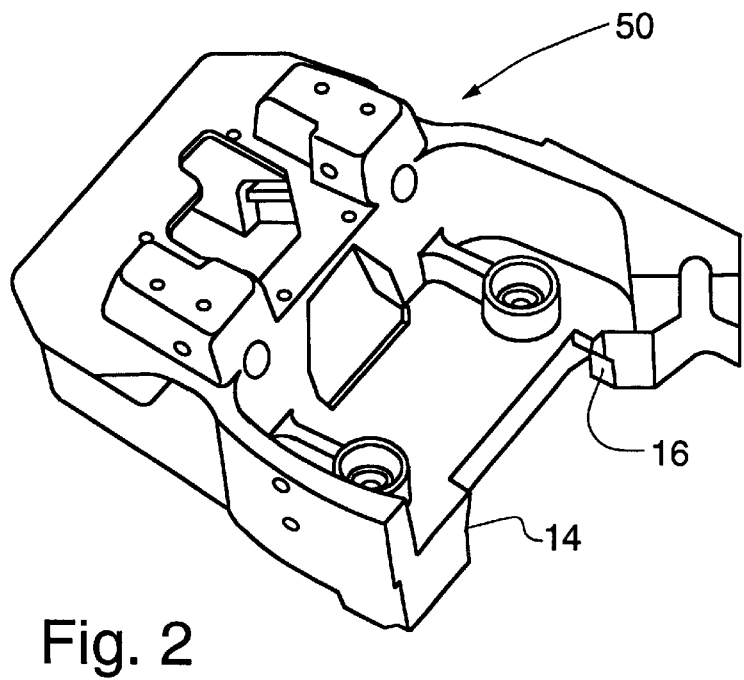
FIG. 2 is a cross-sectional view of a front support casting to be mounted on the front end of a chassis of a tractor (made up of the engine and the transmission)

To mitigate this problem, the invention provides a stop plate 12 that projects from the top of the axle housing 10 and is straddled by two abutment surfaces 14, 16 that form part of a front support casting 50 shown in FIG. 2. This casting 50 is secured to the underside of the tractor engine and projects forwards from the engine to support such items as a radiator.

The interaction between the stop plate 12 and the abutment surfaces 14 and 16 is best understood from FIGS. 3 to 6 which schematically show the housing 10 at different distances below the front support 50 and how the permitted pivoting range increases as the housing 10 moves away from the front support 50.

Figure 3:
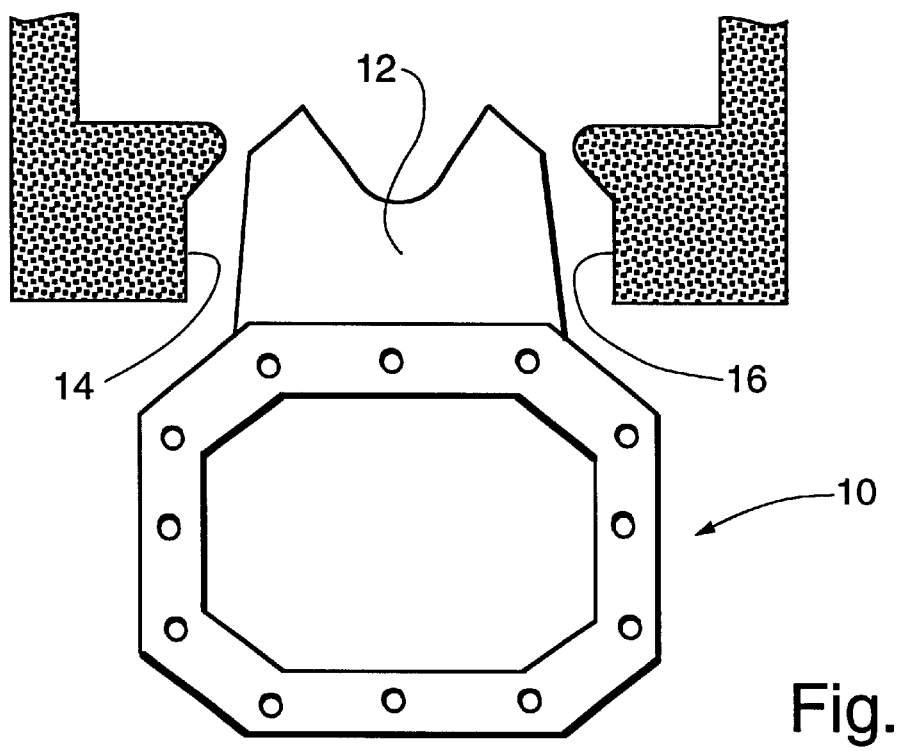
FIGS. 3 to 6 are all similar schematic representations of the middle part of the axle of FIG. 1 and the front support of FIG. 2 as viewed from the front of a tractor, the different views showing the tractor chassis at different heights above the axle and the limit of the range of permitted angular movement of the axle at each height of the vehicle body.

In FIG. 3, the axle housing 10 has moved up from its normal, central position towards the front support 50 with some 30 mm but the wheels are level. This position may occur for example when riding over an undulating metalled surface. In this position, the axle has a small range of pivotal movement.

In case the axle 10 would move up with a further 30 mm (condition not shown in the drawings), then the axle housing 10 would abut the front support 50 on both sides, whereby no pivotal movement of the axle would be possible at all. Such a position represents the fully "compressed" condition of the suspended axle 30.

Figure 4:
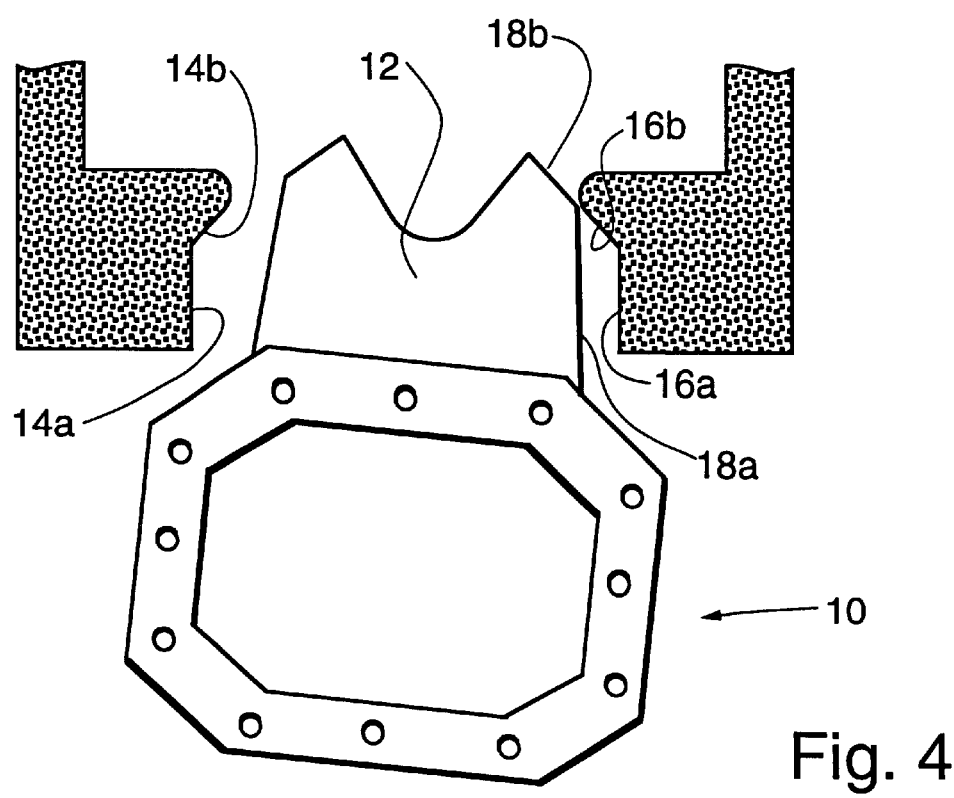

In FIG. 4, the axle housing 10 is at a height comparable to FIG. 3 but the wheels are not level. This may occur if the tractor is driven with one wheel on a sloping bank. The represented articulation of the front axle is about 6°.

Figure 5:
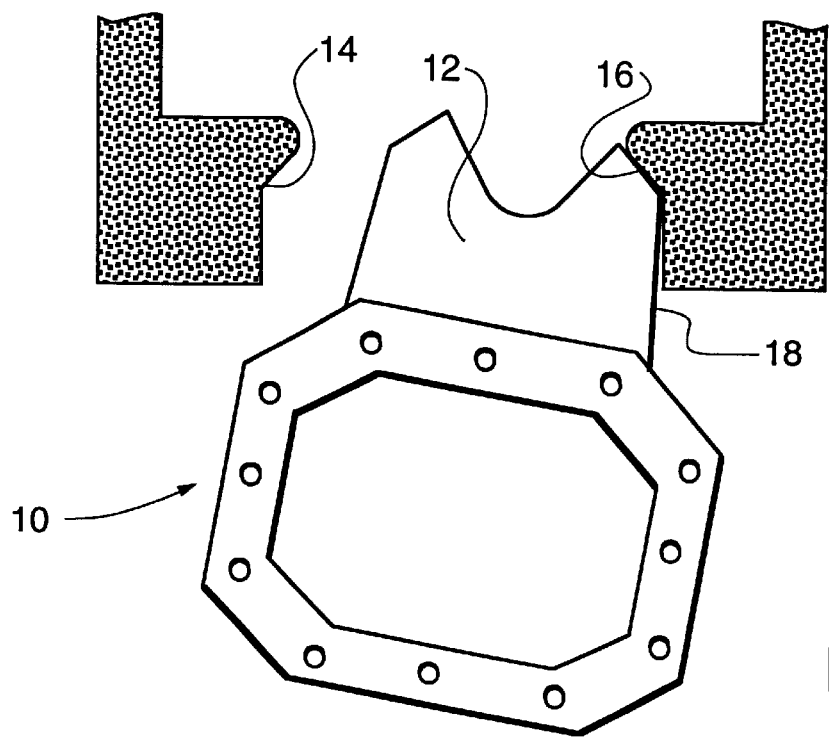
Figure 6:
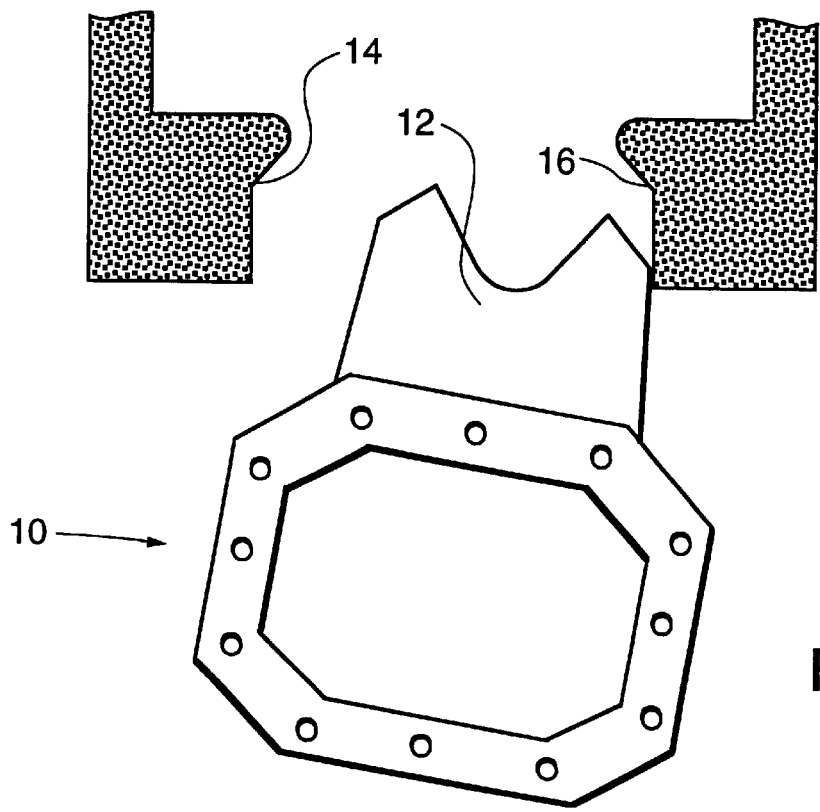

In FIGS. 5 and 6, the axle 10 is shown at the limit of pivotal range after it has dropped further and further away from the support 50 (for example on account of the reaction force from an implement being towed by the tractor). In FIG. 5, the axle housing 10 is at its normal, central height relative to the tractor front support 50 with the housing 10 articulated some 12° with respect to the vertical median plane of the tractor. In the fully "extended" position of the axle 10, represented in FIG. 6, the axle is some 45 mm below the position of FIG. 5, again at an articulation of 12°.

It will be noted from FIGS. 3 to 6 that the abutment surfaces 14, 16 on the front support 50 on the one hand and the side edges 18 of the stop plate 12 on the other hand are so shaped as to minimise the range of rotation of the axle 30 about the vehicle longitudinal axis 35 when the height of the vehicle above the axle 30 is small and to maximise the range of rotation of the axle 30 about the vehicle longitudinal axis 35 when the height of the vehicle above the axle 30 is large.

This is achieved by the stop plate 12 having a first region nearer the axle housing 10 in which the side edges 18a of the stop plate have a small angle of taper and a second region further from the axle housing in which the sides edges 18b of the stop plate 12 have a larger angle of taper. Similarly, the abutment surfaces 14, 16 have a first region 14a, 16a with little or no taper and a second region 14b, 16b formed by a more acutely tapering nose.

Because of the vertical extent of the stop plate 12 and the abutment surfaces 14, 16, they remain effective at all ride heights in controlling the pivotal movements of the housing 10. Furthermore, because they are shaped in the manner illustrated, they can permit the limit of the angular range to be varied as a function of the height of the chassis above the axle housing 10. Of course, the shape of the side edges of the stop plate 12 and the shape of the abutment surfaces 14 can be modified to vary the permitted range of angular movement of the axle at each ride height.

When required, it furthermore is possible to limit the effective range of angular movement on each ride height by adding strips of metal or synthetic material on the abutment surfaces 14, 16 or side edges 18, or on both. Conveniently, these strips may be fastened by means of countersunk bolts.

From the above, it will be appreciated that in the arrangement shown, the total height difference of the axle 30 between the fully compressed and fully extended position is around 105 mm. This value of course is only given as an illustration and may be varied as appropriate taking account of the geometry of the axle.

It will be obvious to those skilled in the art that various changes may be made without departing from the scope of the invention and the invention is not to be considered limited to what is illustrated in the drawings and described in the specification.

What is claimed is:

1. An agricultural vehicle having a front axle mounted on a suspension in a manner that permits the front axle to move up and down in relation to a vehicle body and to pivot about a vehicle longitudinal axis so as to allow the wheels on the ends of the axle to move up and down independently comprising:

a housing of the axle further comprising a stop plate which projects vertically upwards towards the vehicle body; and said vehicle body further comprising abutment surfaces; said abutment surfaces straddling the stop plate and abutting side edges of the stop plate at a limit of a permitted range of rotation of the front axle about the vehicle longitudinal axis.

2. The vehicle according to claim 1, wherein the side edges of the stop plate and the abutment surfaces are shaped to vary a range of angular movement of the axle in dependence upon the height of the vehicle body above the axle.

3. The vehicle according to claim 2, wherein the abutment surfaces on the vehicle body and the stop plate are so shaped as to minimise the range of rotation of the axle about the vehicle longitudinal axis when the height of the vehicle body above the axle is small and to maximise the range of rotation of the axle about the vehicle longitudinal axis when the height of the vehicle body above the axle is large.

4. The vehicle according to claim 3, wherein the stop plate further comprises a first region nearer the axle housing in which the side edges of the stop plate have a small angle of taper and a second region further from the axle housing in which the sides edges of the stop plate have a larger angle of taper.

5. The vehicle according to claim 4, wherein the abutment surfaces on the vehicle body each have a first region with little or no taper and a second region formed by a more acutely tapering nose.

6. The vehicle according to claim 5 further comprising a vertical displacement of the axle relative to the vehicle body is limited to approximately 105 mm.

7. The vehicle according to claim 2, wherein the range of angular movement of the axle varies from 0° articulation to approximately 12° articulation.

* * * * *